Feb. 3, 1925.
C. L. NORTON
MOLDING MACHINE
Filed Dec. 14, 1922
1,524,877
7 Sheets-Sheet 1
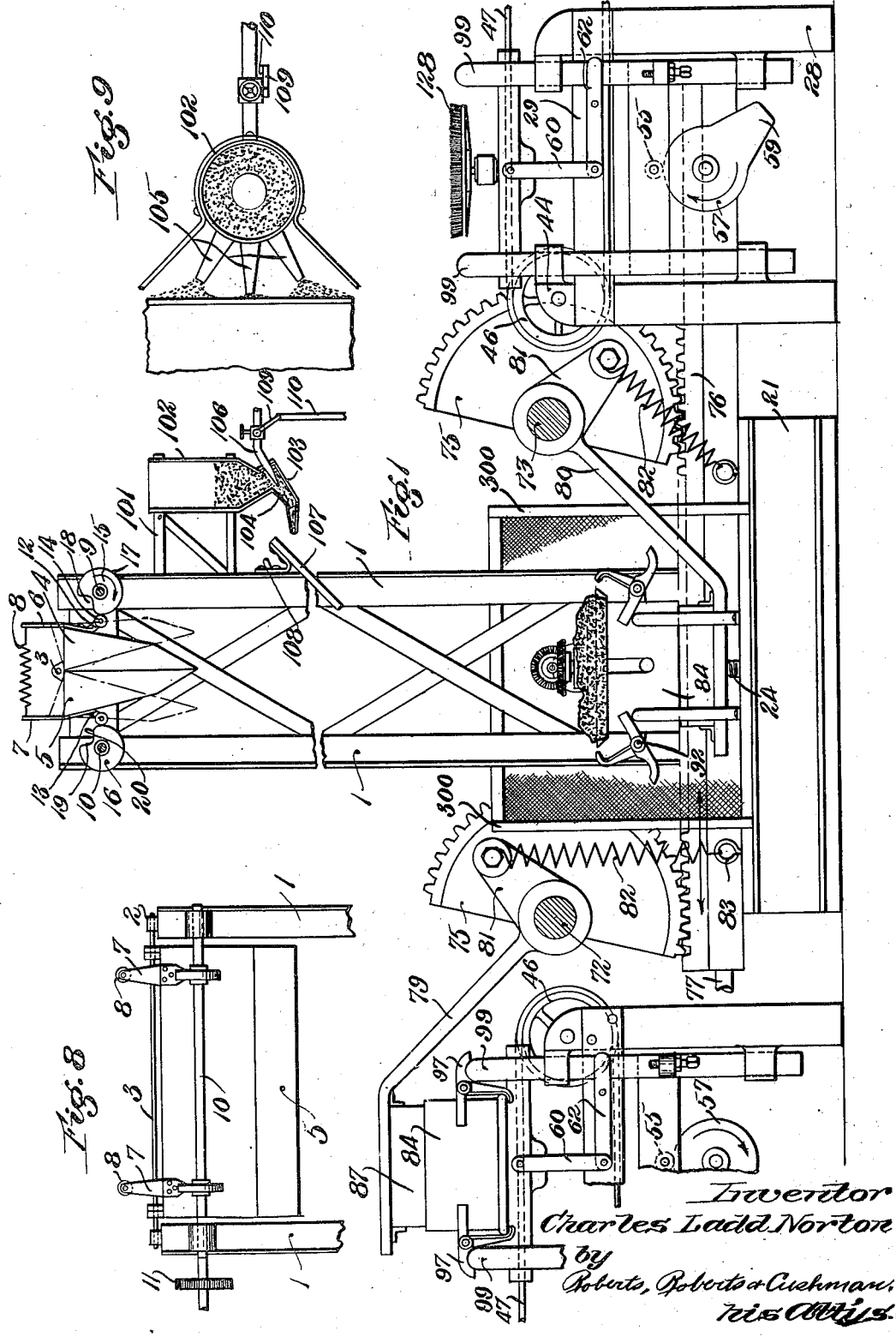
Inventor
Charles Ladd Norton
by
Roberts, Roberts & Cushman
his Attys.

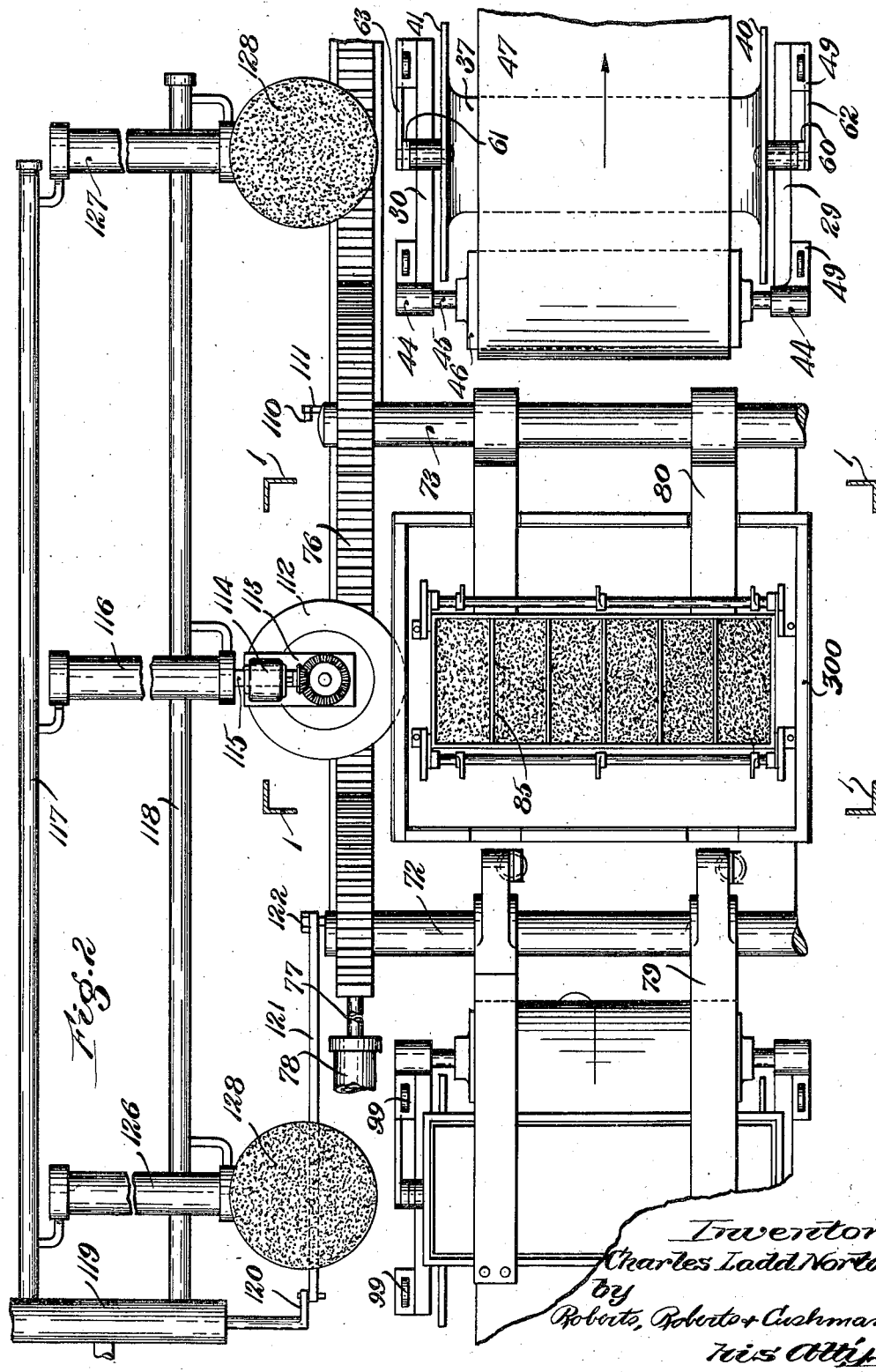

Feb. 3, 1925.
C. L. NORTON
MOLDING MACHINE
Filed Dec. 14, 1922
1,524,877
7 Sheets-Sheet 3
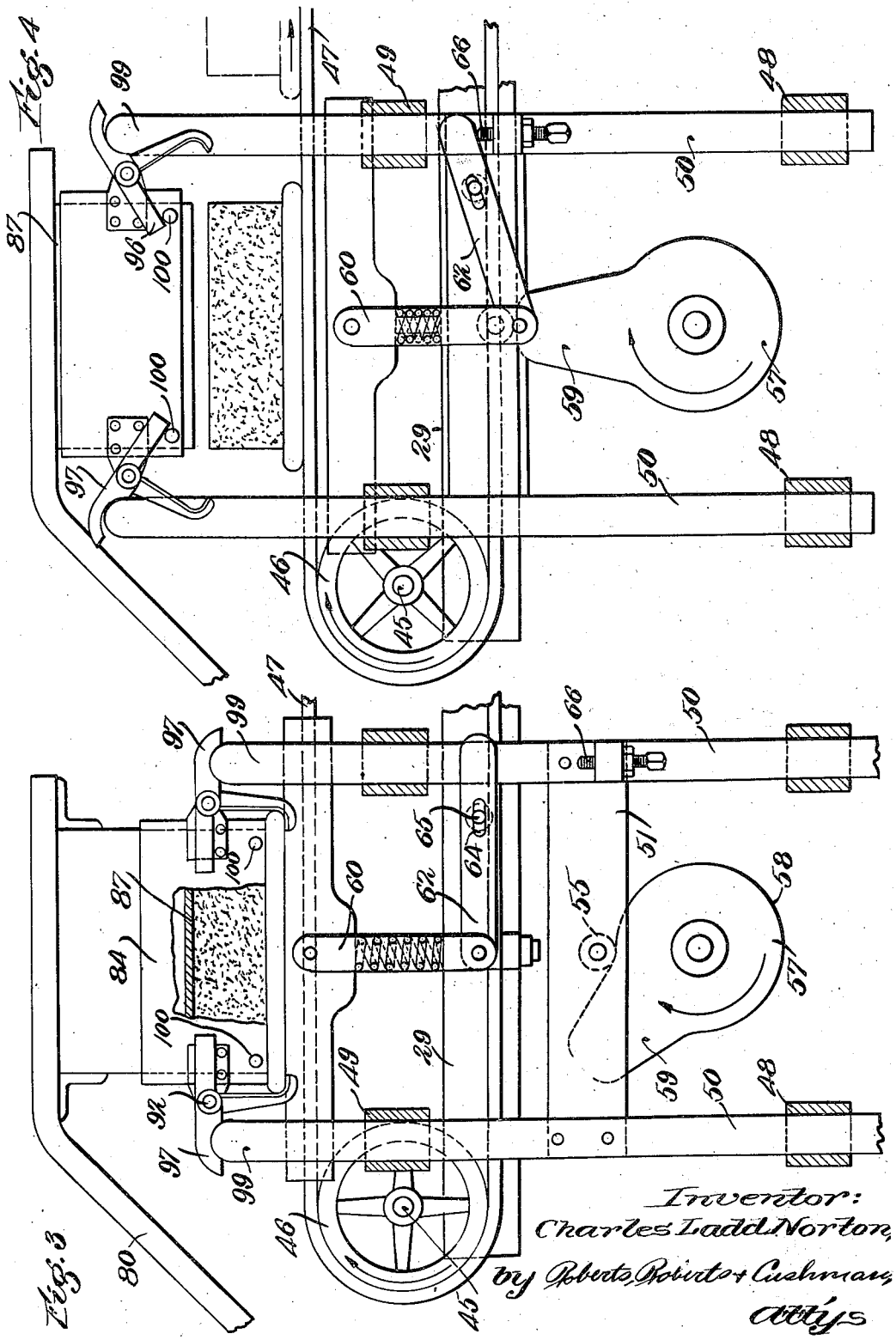

Feb. 3, 1925.

C. L. NORTON

MOLDING MACHINE

Filed Dec. 14, 1922   7 Sheets-Sheet 4

1,524,877

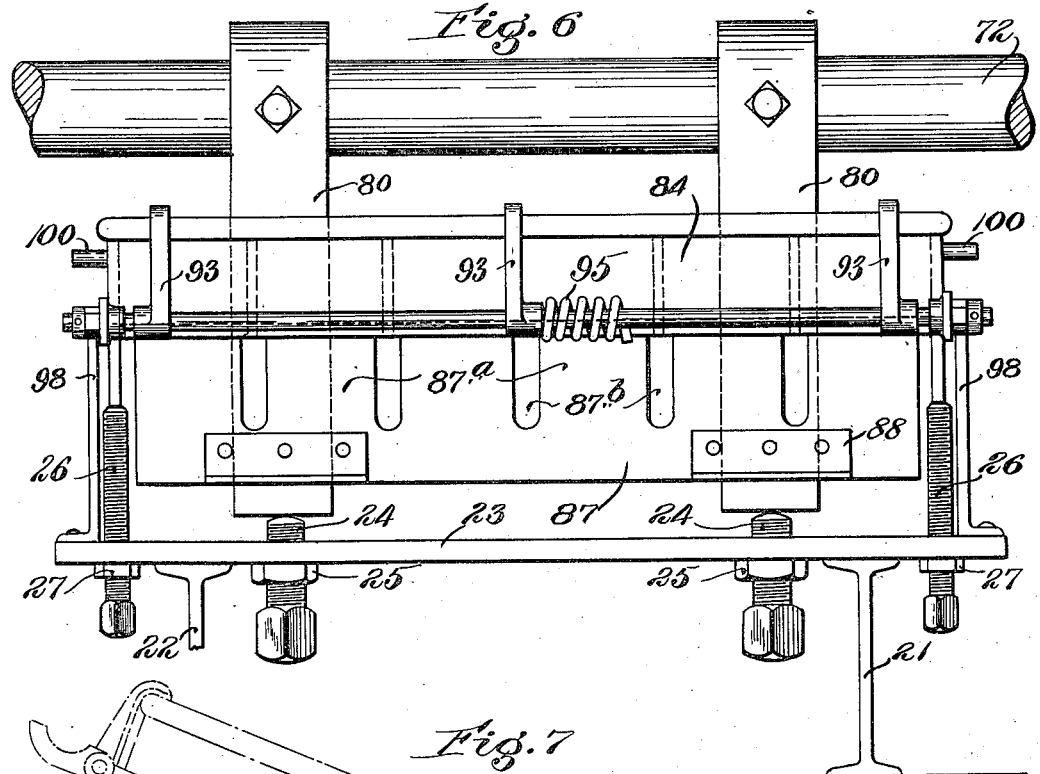

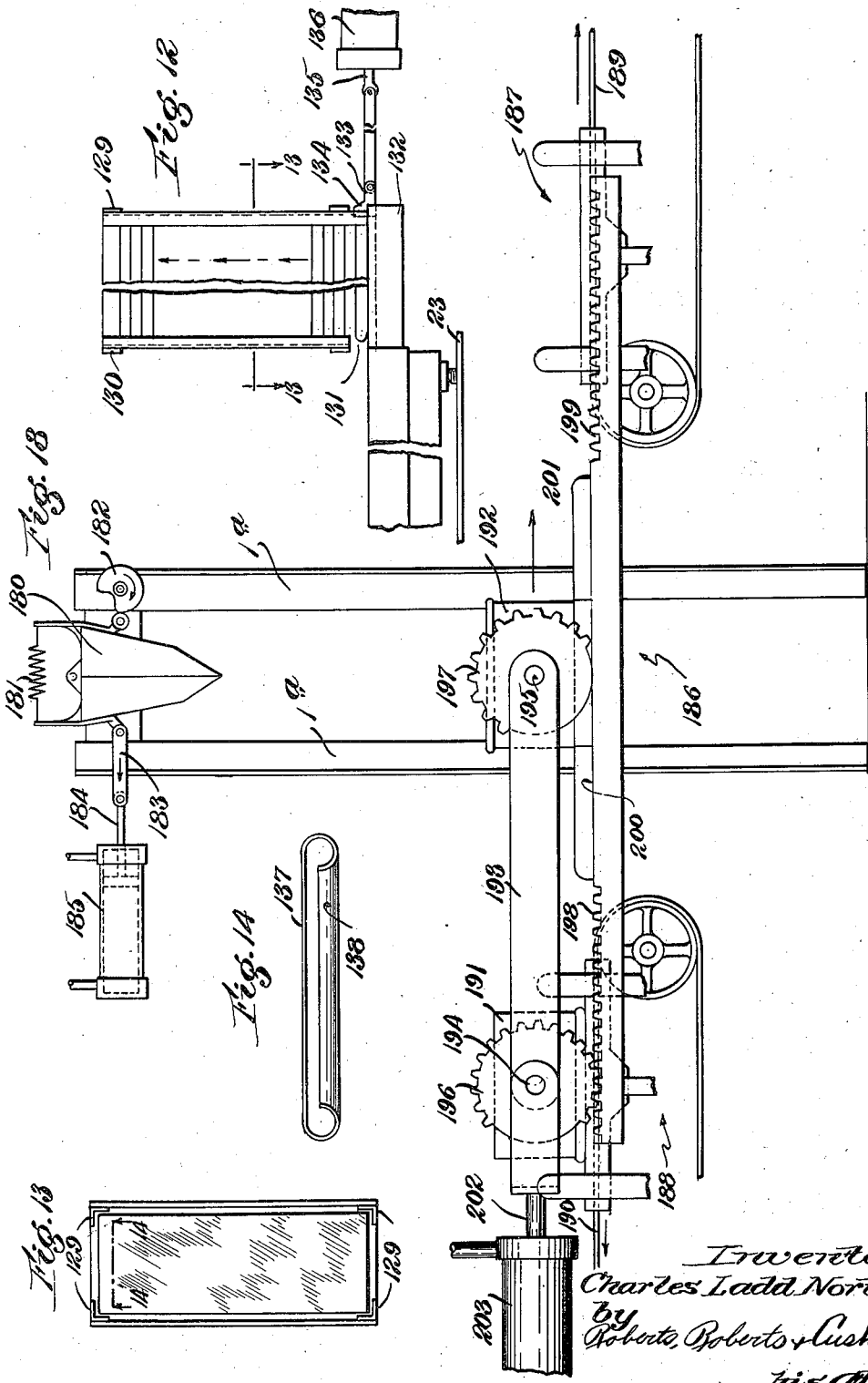

Feb. 3, 1925.
C. L. NORTON
MOLDING MACHINE
Filed Dec. 14, 1922
1,524,877
7 Sheets-Sheet 7
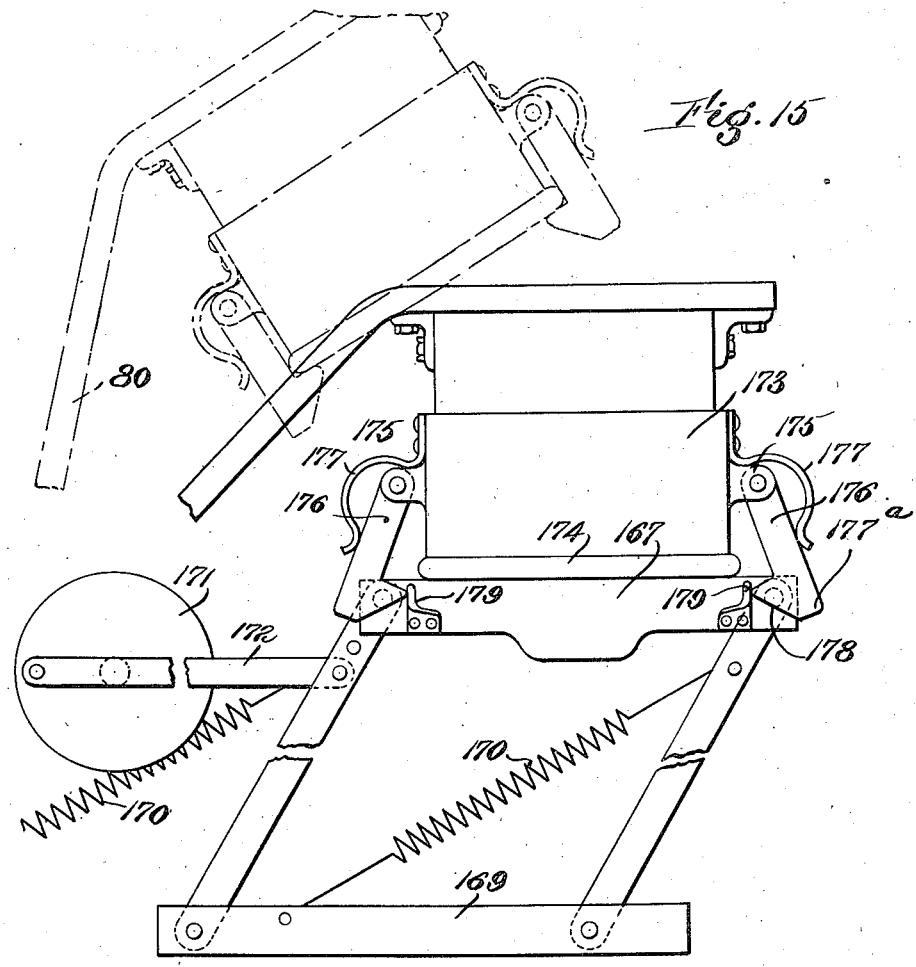
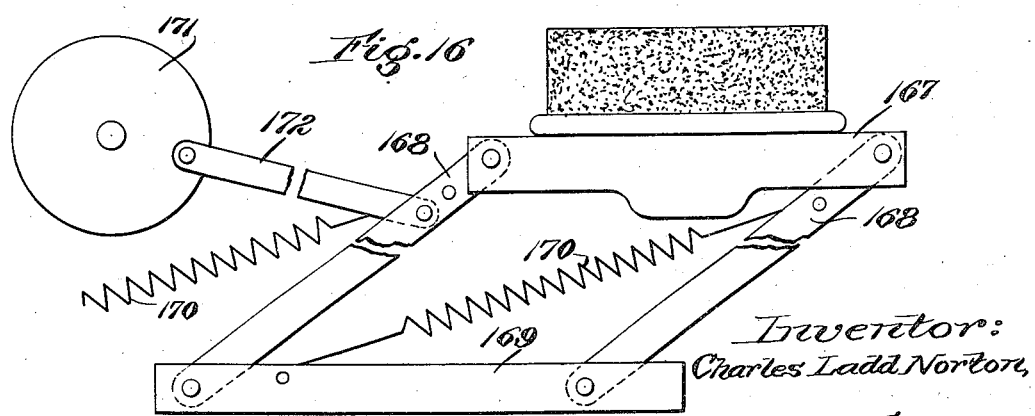
Inventor:
Charles Ladd Norton,
by Roberts, Roberts & Cushman,
his Attys.

Patented Feb. 3, 1925.

1,524,877

UNITED STATES PATENT OFFICE.

CHARLES LADD NORTON, OF BOSTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

MOLDING MACHINE.

Application filed December 14, 1922. Serial No. 606,869.

*To all whom it may concern:*

Be it known that I, CHARLES L. NORTON, a citizen of the United States of America, and resident of Boston, in the county of Suffolk and State of Massachusetts, have invented new and useful Improvements in Molding Machines, of which the following is a specification.

This invention pertains to molding machines and relates more particularly to mechanism useful in the molding of refractory bricks or other shapes from granular material such as ground ganister.

As more fully explained in my Patent No. 1,352,677, dated March 2, 1920, the molding of shapes from such material is attended with the greatest difficulty and prior to my inventions, as disclosed for example in said patent, the manufacture of such shapes was successfully practised as a hand process only. As stated in said patent, the material employed for making refractory shapes differs in physical characteristics and behavior to a very marked degree from the usual clays employed in the manufacture of brick, tile, terra cotta, etc., resembling coarse and slightly damp sand more than clay. This difference in physical behavior is noticeable not only in the filling of the molds as described at length in my patent, but in all subsequent stages of the process. For example, the molded shapes after ejection from the mold are so friable that the slightest shock or jar causes the corners and edges to break off so that the molded shape is utterly ruined for commercial use and even if the filled mold be subjected to sudden shock or change in momentum, as by abruptly and intermittently stopping and starting it during its travel from the filling point to the discharge point, the quality of the molded shape is greatly impaired, as the water contained in the mass, together with the finer particles of solid material, is brought to the surface at one end or the other of the molded shape by the unequal or varying pressure of the mass against the walls of the mold, thus producing finished shapes whose opposite ends are of dissimilar appearance which detracts from their commercial value.

In the above noted patent, as well as in my Patent No. 1,434,662, dated November 7, 1922, I have disclosed mechanical and power driven means capable of molding shapes from such material at a rate far greater than that attainable by hand. In each of the patented machines substantially the same order of steps is employed as in the hand process of molding, that is to say, the charge of material is projected in the form of a dense, unrestrained swarm of discrete particles into an open mold box in quantity sufficient to fill the latter to overflowing; the surplus material is then scraped or "slicked" off; a pallet or cover plate is applied to the top of the mold box; and the mold box, with the pallet, is inverted and the molded shape is ejected therefrom, the pallet, with the molded shape resting thereon being then conveyed to the drying oven.

The principal object of the present invention is to provide novel and improved mechanism for practising the above described process, but of somewhat more simple character than that disclosed in the aforesaid patents, while at the same time securing all of the advantages of the patented machines so far as speed of manufacture is concerned, together with greater uniformity in the finished product. Other objects are to improve the charge releasing means; to provide for imparting the necessary movement to the molded shape without imparting any substantial jar, shock or vibration thereto at any stage in the process; to prevent spattering the molded shapes, whether in the mold or after ejection therefrom, with surplus material from a subsequent charge; to provide moving parts of minimum mass whereby the momentum and inertia may be decreased with consequent increase in speed of operation and more efficient consumption of power; to provide a mold box of improved type suitable for the formation and ejection of perfectly formed shapes and capable of long continued use in association with a mechanically operated slicker; to provide improved means for clamping pallets to the respective molds and releasing the clamping means at the proper stage of the operation; to provide improved means for causing ejection of the molded shapes from the mold box at the proper time; to provide for cleaning parts associated with the mold box after the ejection of each molded shape; and to provide for the delivery of the molded shape resting upon its pallet from the vicinity of the molding mechanism proper.

With the above objects in view the mechanism preferably comprises one or more pairs of mold boxes, each having a telescopic bottom member or push plate and clamping means for securing a pallet plate to its top. The boxes of each pair are supported for movement alternately into position for receiving a charge of material from suitable delivery means. After receiving the charge a pallet plate is secured to the mold box by the clamping means and the mold supporting means is so manipulated as to move the filled mold box bodily to one side of the filling position and to deposit it in inverted position upon an unloading table preferably arranged at a level higher than that at which the mold is filled. Suitable devices then release the pallet clamping means and lift the mold box vertically relatively to its bottom member so that the molded shape is ejected from the mold and left standing upon the pallet which at this time rests upon the unloading table. This table is now lowered slightly to deposit the loaded pallet upon an endless conveyor by means of which it is moved away from the vicinity of the molding mechanism proper. Preferably a screen is interposed between the unloading table and the point at which the mold is filled in order to prevent spattering the molded shape with surplus material from a subsequent charge. The elevated position of the unloading table also contributes to this desirable result. The mold moving means is so timed that while one mold box is receiving its charge, the other is ejecting its charge. While a single unloading table may be employed it is preferred to use two tables arranged at equal distances from the filling point and at opposite sides thereof and to mount the mold boxes upon a pair of independent lever arms arranged to swing simultaneously in the same direction for transferring the respective boxes from filling to unloading position and vice versa. Preferably the boxes are supported upon a fixed table or anvil while being filled and any suitable means such for example as that disclosed in my Patents Nos. 1,332,677, March 2, 1920 or 1,426,761, August 22, 1922 may be employed for delivering the charge into the mold. If means generally similar to that disclosed in the first cited patent be employed, it is preferred to provide quick acting means such as a spring or springs for opening the charge delivering hopper and to employ a cam, compressed air cylinder, or other power actuated means for closing it. Suitable slicker mechanism, such for example as is shown in my co-pending application Serial No. 558,686, May 5, 1922, is provided for removing the surplus material from the top of the mold and the mold box is made deeper than the thickness of the finished shape to compensate for wear occasioned by the movement of the slicker, the telescopic bottom of the box being provided with adjustable stops whereby its normal position may be varied. Preferably, also the box and its bottom are provided with co-operating guide elements insuring greater accuracy in movement for the telescopic bottom member. A rotary brush device is also provided, preferably movable in time with the slicker, for cleaning the surface of the bottom member of the mold after the ejection of each molded shape. Other and desirable details and combinations of parts will more fully be described in the specification and shown in the accompanying drawings, it being understood that the specific arrangements herein disclosed are by way of example only and illustrative of the varied and equivalent structures in which the present invention might be embodied.

Fig. 1 is a fragmentary side elevation of the machine, certain parts being omitted and certain parts being shown in section;

Fig. 2 is a fragmentary plan view of the machine, parts being omitted and other parts being shown in section;

Fig. 3 is a fragmentary side elevation of the right-hand unloading table as viewed in Fig. 1, but to larger scale, showing one of the mold boxes as having just arrived in position for ejection of the moulded shape;

Fig. 4 is a view similar to Fig. 3 but showing the mold box as lifted and the molded shape as discharged therefrom and resting upon the pallet;

Fig. 5 is an end elevation of the parts shown in Fig. 4, the mold box being omitted and certain parts being shown in section;

Fig. 6 is a fragmentary side elevation to large scale showing one of the mold boxes as resting upon the anvil and with the pallet plate secured thereon;

Fig. 7 is an end elevation to large scale of one of the mold boxes and associated parts, the box being indicated as having just been filled and the slicker disk being shown as resting upon the top of the box;

Fig. 8 is a fragmentary side elevation of the delivery hopper showing preferred means for opening and closing the latter;

Fig. 9 is a fragmentary plan view of a sanding device employed for coating the interior of the mold box with sand;

Fig. 10 is a fragmentary diagrammatic view illustrating a cleaning brush employed for cleaning the surface of the bottom element of the mould box after ejection of the molded shape;

Fig. 11 is a fragmentary detail illustrating the slicker disk and the means for driving the same;

Fig. 12 is a fragmentary side elevation of a pallet magazine with associated parts and with a mold box positioned for receiving a pallet from the magazine;

Fig. 13 is a plan view of the pallet magazine of Fig. 12;

Fig. 14 is a transverse cross section to larger scale of a pallet taken on a line such as 14—14 of Fig. 13;

Figs. 15 and 16 are fragmentary side elevations illustrating a modified form of unloading table showing such table in position for receiving the mold box and for delivering the molded shape after removal of the box respectively;

Fig. 17 is a transverse cross section to small scale showing a modified form of mold box; and Fig. 18 is a fragmentary side elevation illustrating modified means for moving the mold boxes from filling to discharging position.

In the drawings many of the non-essential elements such as the supporting frame work and other parts whose exact configuration and arrangement is merely a matter of design and mechanical skill, have been omitted in order that the essential elements of the mechanism may more clearly be illustrated.

Delivery hopper.

Referring to Fig. 1 the numeral 1 indicates vertical supporting posts which are suitably connected and braced and which provide bearings 2 for a shaft 3 to which the opposite halves 4, 5 of a clam-shell type delivery hopper are hinged. The halves of the hopper are substantially alike and the hopper is preferably of tapering or inverted wedge shape as indicated in Fig. 1. Pairs of brackets 6, 7 project upwardly from the members 4, 5 respectively of the hopper and the brackets of each pair are connected by a coiled spring 8, the several springs normally tending to swing the parts 4, 5 away from each other about the axis of the shaft 3. Shafts 9 and 10 are mounted in journals in the supporting posts at opposite sides of the hopper and these shafts may be driven in unison from any desired source of power. Preferably these shafts are provided with gear connections 11 in order to insure their simultaneous rotation. Brackets 12, 13 project from the outer sides of the respective hopper members 4 and 5 and these brackets are furnished with anti-friction rollers 14. Cams 15, 16 are mounted upon the shafts 9, 10 respectively and these cams are arranged to turn in the planes of the rollers 14. The cams are of identical construction and each comprises a substantially concentric portion or dwell 17 extending through approximately three-fourths of its circumference and a depression 18 defined by surfaces 19, 20 respectively, the surface 19 being substantially radial. The concentric portions of these cams are of such diameter as normally to hold the parts 4, 5 of the hopper in closed, engaging position against the action of the springs 8. When however, the rollers 14 drop into the recesses 18, the springs 8 are enabled to swing the parts 4, 5 of the hopper away from each other and this movement is substantially instantaneous by reason of the arrangement of the surfaces 19 of the respective cams. The charge contained in the hopper is thus deprived instantaneously of both lateral and vertical support and after it has dropped from the hopper the latter is quickly closed by rotation of the cams and is held closed during considerably more than a half revolution of the cams.

Anvil.

Directly below the hopper a mold supporting anvil is arranged. The anvil structure comprises a pair of I beams 21, 22, suitably supported on the frame of the machine and a plate 23 which is mounted upon the upper edges of the I beams. Preferably this plate is provided with threaded openings for the reception of set screws 24 whose upper ends constitute the effective surface of the anvil. These set screws may be adjusted to the desired level and may then be retained in position by means of lock nuts 25. The anvil is also provided with threaded openings for the reception of the set screws 26 whose function will hereinafter be described and which may be secured in adjusted position by means of lock nuts 27. At either end of the anvil an unloading table is arranged, such tables being spaced at substantially equal distances from the center of the anvil and preferably in a plane above that of the anvil in order to minimize spattering of material from the vicinity of the anvil onto such tables. As these unloading tables are of identical construction but one is specifically described herein.

Unloading tables.

Referring to Figs. 1, 3, 4 and 5, the right-hand unloading table is shown as comprising vertical posts 28 which serve to support channel bars 29, 30. Brackets 31, 32 are secured to the respective bars and these brackets are provided with sleeves 33, 34 in which rods 35, 36 are arranged to slide. To the upper ends of these rods a yoke member 37 is secured, this yoke member having the upwardly directed end portions 38, 39, whose upper edges 40, 41 constitute the unloading tables proper. Surrounding the rods 35, 36 are coil springs 42 which rest upon the upper ends of the sleeves 33, 34 respectively and which serve normally to support the yoke member 37 at a predetermined height.

The rods 35, 36 preferably project downwardly below the lower ends of the sleeves 33, 34 and are provided with adjustably fixed collars 43 which limit the upward movement of the yoke member 37 under action of the springs 42. The inner pair of posts 28 are provided with bearing brackets 44 (Fig. 2) in which is journaled a shaft 45 upon which a roller 46 is mounted. A conveyor belt is trained about this roller. The upper run 47 of the belt lies in a plane slightly below the normal plane of the unloading table as defined by the surfaces 40, 41. This belt extends outwardly in a longitudinal direction beyond the end of the machine proper and passes over a suitable driving roller or rollers, not shown. The upper run of the belt serves as pallet supporting means for conveying the molded shapes from the unloading table to a convenient point from which they may be removed to the drying ovens by the workman.

The posts 28 are provided with brackets 48, 49 at their upper and lower parts respectively and these brackets are furnished with aligned openings in which rods or bars 50 are arranged to slide vertically. At a point intermediate the guiding brackets 48, 49 the front pair of bars 50 is connected by means of a crosshead 51, the rear pair of bars being likewise connected by a crosshead 52 (Fig. 5). Pins 53, 54 project inwardly from the crossheads and on these pins rollers such as 55 are journaled to turn. A shaft 56 is journaled in suitable bearings in the frame of the machine and this shaft is provided with a pair of cams 57, which lie in the planes of the respective rollers 55. These cams are of like contour, each comprising a substantially concentric portion or dwell 58 and an offset or active portion 59. The two cams are similarly arranged upon the shaft and upon rotation of the shaft serve to raise the crosshead 51 by engagement with the rollers 55, the crosshead being raised and lowered alternately. This movement of the crosshead imparts corresponding movement to the rods or bars 50.

Links 60, 61 are pivotally secured to the opposite ends of the yoke member 37, and extend downwardly and are pivotally connected at their lower extremities to the inner ends of the levers 62, 63, respectively. Each of these levers is slotted at a point intermediate its ends as indicated at 64, Fig. 3, for the reception of a fulcrum pin 65 projecting outwardly from the members 29, 30 respectively. The opposite extremities of the respective levers lie in the paths of movement of a pair of adjustable abutment screws 66, 67 having threaded engagement with brackets 68, 69 carried by one of the front and rear rods 50 respectively. These adjustable abutment screws may be provided with lock nuts 70 if desired. Upon upward movement of the cross head 51, the stop screws are ultimately brought into contact with the outer ends of the levers 62, 63 and swing such outer ends upwardly thereby depressing the inner ends of the levers and pulling the table, comprising a yoke member 37, downwardly in opposition to the action of springs 35, 36. This downward movement is of sufficient extent, as determined by the adjustable members 66, 67 and the active portions 59 of the actuating cams, to bring the table comprising the surfaces 40, 41, to a level slightly below that of the upper surface of the upper run 47 of the conveyor.

*Mold actuating mechanism.*

At points intermediate the anvil and the respective unloading tables, horizontal shafts 72, 73 (Fig. 1) are suitably journaled in bearings in the frame of the machine. The axes of these shafts are preferably in a plane above that of the upper surface of the anvil and below the plane of the unloading tables. Upon each of the shafts 72, 73 a segmental gear 75 is secured, these gears being similarly disposed on the shafts as indicated in Fig. 1. A slidable rack bar 76 is arranged in the vertical plane of the gears 75 and meshes with the latter. This bar is reciprocated in any desired manner as for example, by means of a piston rod 77 having a piston operating in a cylinder 78 to which pressure fluid may be admitted by any desired form of valve mechanism. Reciprocation of the rack bar 76 produces oscillation of the gears 75 and a similar oscillation of the shafts 72, 73. Pairs of lever arms 79, 80 respectively are secured to the respective shafts, the lever arms of both pairs extending in the same general direction, and a mold box is secured to the free extremities of each pair of arms. Each of the shafts is also provided with a crank arm 81 disposed at an angle to the plane of the corresponding pair of lever arms, and to such crank arms springs 82 are secured. The opposite ends of these springs are connected to members 83 fixed to the frame of the machine at any convenient point, the arrangement of the parts being such that these springs substantially counterbalance the weight of the respective mold boxes and their supporting lever arms. Screen members 300 of suitable height are arranged adjacent to the anvil and serve to prevent portions of the charge from spattering up from the mold box onto the unloading tables and onto molded shapes resting thereon. These screen members are so shaped as not to interfere with the movement of the mold carrying device.

*Mold boxes.*

Each of the mold boxes comprises a substantially rectangular upper portion 84 open at top and bottom and provided, if desired, with transverse partitions 85 dividing it into a series of like compartments of a size and shape corresponding to that of the brick or other molded shape to be formed. Within this open mold box a bottom member 87 is arranged to slide or telescope. This member comprises a hollow box-like structure whose upper portion is divided into a series of blocks 87ª fitting the respective compartments of the mold box and separated by slots 87ᵇ which accommodate the partitions of the mold box. The tops of the blocks are imperforate and collectively constitute a movable mold bottom member or push plate. The bottom member 87 is secured, by means of angle brackets 88 and suitable rivets, to the outer portion 89 of the corresponding lever arms. The end walls of the mold box 84 are provided with slots 90 for engagement with pins such as 91 projecting outwardly from the bottom member 87, such pins serving to support the mold box proper as the bottom member or push plate is swung about the axis of the corresponding shaft. As indicated in Fig. 7 the parts 89 of the lever arms bear upon the set screws 24 of the anvil member when in the filling position, such set screws serving to determine the exact position of the levers and push plate during filling. In order to determine the thickness of the molded shape, the adjustable set screws 26 are provided, the upper ends of which engage the edges of the end walls of the mold box and serve to determine the height of the box above the anvil while the mold box is in filling position. Thus by means of the set screws 26 and 24 the position of the mold box proper and of its bottom member 87 may be accurately adjusted and as the upper edge of the mold box is worn by the action of the slicker device, adjustment of these set screws may be made to compensate for such wear so that a uniform thickness of such brick may be maintained.

Pallet clamping means.

Upon each side of the mold box a shaft 92 is journaled to turn in suitable brackets. Each shaft is provided with a plurality of latch members comprising the arms 93, having the overhanging shoulders 94 which are adapted to engage over the edges of a pallet plate resting upon the mold box and to clamp such plate to the box. Each shaft is provided with a spring 95 which normally tends to turn the shaft in a direction to move the latch members to operative position. At each end of each of the shafts an inwardly directed arm 96 and an outwardly directed arm 97 is provided. Each end of the anvil is furnished with a pair of upstanding posts 98 which are so disposed that as the mold box with its associated parts is moved downwardly onto the anvil, these posts engage the inwardly extending arms 96 and swing the respective shafts 92 in such manner as to move the latch members 93 to inoperative position.

Referring to Figs. 3 and 4 it may be seen that the outwardly extending arms 97 carried by the shafts 92 lie in the vertical planes of movement of the rods or posts 50 hereinbefore described. The upper ends 99 of these posts contact with the arms 97 as the posts are elevated, thereby swinging the latches to inoperative position as indicated in Fig. 4. The end members of the mold boxes are provided with outwardly projecting pins 100 which serve to limit the swinging movement of the arms 96. As indicated in Fig. 4, the arms 96 have been moved into contact with these pins and any further upward movement of the rods or bars 50 serves to lift the mold box proper relatively to the bottom member or push plate thereof as will hereinafter be described at greater length.

Mold sander.

A supporting bracket 101 (see Fig. 1) is secured to the structure comprising the posts 1, and a receptacle 102 is mounted upon this bracket. This receptacle is provided with a downwardly inclined portion 103 forming a chamber 104 which terminates in a series of horizontally diverging delivery spouts 105. An air blast nozzle 106 projects into the chamber 104 and this nozzle may be connected with any suitable source of air under pressure. An inclined deflector plate 107 is secured by means of a bracket 108 to posts 1 and is so positioned that sand discharged through the spouts 105 under the action of the jet of compressed air is dispersed and directed into a mold box resting upon the anvil. Preferably the sand employed is very finely ground quartz or material of similar characteristics and when blown outwardly by a puff of air from the nozzle 106 forms a cloud which coats substantially the entire inner surface of the mold box with a thin film which serves to prevent sticking of the mold charge thereto. The delivery nozzle may be controlled by a suitable valve operated intermittently in any desired manner, as for example, by means of a crank arm 109 connected by means of a link 110 to a crank pin 111 projecting from the end of the shaft 73.

Slicker.

For slicking off the surplus material after filling the mold, a rotary disk 112 is preferably employed. This disk is journaled in a carriage 113 upon which a driving motor 114 is mounted, such motor being electrically driven and serving to impart rapid rotation to the disk 112. This carriage is preferably supported upon a piston rod 115 having a piston working in a pneumatic cylinder 116 which may be supplied with air from pipes 117, 118. Air may be admitted to these pipes from a suitable source through a valve chamber 119 having a rotary valve controlled by means of a crank arm 120 connected by a link 121 to a crank pin 122 projecting from the end of the shaft 72. With this arrangement the carriage 113 with the rotating slicker disk may be caused to move forwardly over the entire length of the mold box and then rearwardly to the position shown in Fig. 2.

Cleaning device.

The mold bottom member or push plate is usually provided with raised indicia for impressing the surface of the molded shape, and after the ejection of such shape it is desirable to clean such raised indicia to which particles of the charge frequently adhere. For this purpose rotary brushes are provided in association with each of the unloading tables. Each of these brushes comprises a disk or back member 123 carried by the vertical shaft 124 of an electric motor 125. These motors are mounted respectively upon piston rods working in pneumatic cylinders 126, 127, to which pressure fluid is supplied from the pipes 117, 118. Each of the back members is furnished with axially upstanding brush tufts 128 and after the discharge of the molded shape from the mold box the carriage with the rotating brush is traversed longitudinally across the under surface of the bottom member of the mold box thereby wiping off material which may cling thereto. As herein disclosed both brushes reciprocate simultaneously and in time with the slicker disk, it being evident however, that one of the brushes moves idly while the other is operatively engaging the bottom plate of the mold.

Pallet magazine.

While ordinarily the pallets will be applied manually to the mold boxes after the material has been slicked off, it is contemplated that under some circumstances, it may be found desirable to apply the pallets automatically. For this purpose a suitable magazine may be provided comprising spaced posts 129 of angle iron defining the corners of a rectangle of substantially the dimensions of the pallet plates. These posts may be secured together by means of cross bars such as 130 if desired, the lower portions of the posts at one side of the magazine being cut away as indicated at 131 to provide a passage for the ejection of the lowermost pallet plate. The bottom member 132 of the magazine is arranged substantially in the plane of the upper edges of a mold box when resting upon the anvil and this bottom member is provided with one or more transverse slots in which an ejector rod or rods 133 is arranged to slide. These rods are provided with outstanding shoulders 134 which are engageable with the edge of the lowermost pallet plate for pushing such plate out from beneath the pile of pallets within the magazine and onto the top of the mold box. This rod or rods 133 may be suitably actuated by means of a piston 135 working in a pneumatic cylinder 136 receiving a supply of air from any suitable source controlled by a valve actuated in time with the other parts of the mechanism by any desired form of connection. The pallet plates 137 employed are of the type indicated in Fig. 14, being formed from sheet material and preferably provided with rolled edges 138 which serve to strengthen them and at the same time to make them easier to manipulate.

Operation.

The operation of the machine as thus far described is substantially as follows, it being assumed that a charge of material has been placed in the hopper whose parts 4 and 5 are held in closed position by means of the dwell portions of the cams 15 and 16 and that the shaft 73 has been turned in a counter-clockwise direction so that its mold box rests upon the anvil. The position of the parts of the mold box at this time is indicated in Fig. 7. In this view however, the slicker is shown as over the mold box whereas at this stage of the operation it properly occupies the inoperative position shown in Fig. 2. The cams 15, 16 which are constantly rotated now come into such position that the rollers 14 drop down the radial surfaces 19 thereby permitting the spring 8 suddenly to open the hopper. This allows the charge to fall freely and in an unrestrained mass comprising a swarm of discrete particles which enter the mold box at high velocity, filling the box to overflowing. The continued rotation of the cams quickly brings the rollers 14 into engagement with the surfaces 20 whereby the parts of the hopper are closed ready for the reception of a new charge. In the meantime the slicker carriage is operated to carry the rotating slicker disk forwardly and longitudinally of the mold box, thereby wiping off surplus material and smoothing the upper surface of the molded shape within the box. The slicker carriage now retires and a pallet is placed upon the top of the mold box, either by hand or by means of the mechanism above described and shown in Fig. 12. The shaft 73 now begins to turn in a clockwise direction under the action of the rack bar 76, thereby swinging the arm 80 in a clockwise direction and carrying the mold box upwardly as indicated in broken lines in Fig. 7. As soon as the mold box starts upwardly the arms 96 are carried out of engagement with the upper ends of the post 98 whereupon the springs 95 turn the shafts 92 in such direction as to move the latch members 93 over the edges of the pallet plate thereby clamping the latter to the mold box. The shaft 73 continues to turn until the filled mold box with its pallet plate and bottom member is swung over onto the right-hand unloading table. As will be noted from inspection of Fig. 1 this movement of the mold box causes it to move to a level higher than that at which it is filled and at the same time causes the box to be inverted. At the end of the movement, the ends of the pallet plate rest upon the surfaces 40, 41 of the yoke member 37 which constitute the unloading table. The combined mold box structure with the pallet plate comes to rest on the unloading table with the pallet plate clamped to the mold box. The shaft 56 which is continuously turning now brings the cam elements 59 into engagement with the rollers 55, thereby lifting the crossheads 51 with the rods 50. The upper ends of these rods first contact with the arms 97 and swing the shafts 92 in opposition to their springs 95, thus moving the latch members 93 out of engagement with the pallet so that the latter is disconnected from the mold box. As the arms 97 continue to swing upwardly, the arms 96 are swung downwardly into contact with the pins 100 so that swinging movement of the arms 97 relative to the mold box is limited. Continued upward movement of the rods 50 now raises the mold box bodily in a vertical direction with respect to the bottom member 87 of the mold box which remains in its original position. This movement of the mold box causes it to slide upwardly from the molded shape leaving the latter resting upon the pallet plate and between the latter and the push plate. As the mold box clears the upper edge of the molded shape, the pins 66, 67 contact with the outer ends of the lever arms 62, 63 respectively, thereby, through the links 60 and 61, depressing the unloading table. Downward movement of the unloading table causes the loaded pallet to descend until it rests upon the upper run 47 of the conveyor belt. This belt immediately picks up the pallet with its load and conveys the loaded pallet away from the unloading table and into a position where it may conveniently be removed by a workman for carriage to the drying oven. Immediately after the removal of the loaded pallet plate by the conveyor belt the brush carriage is moved forwardly beneath the push plate which at this time projects downwardly to a slight distance below the lower edge of the mold box as seen in Fig. 4. As the brush carriage is moved forwardly the brush is rotated, thus thoroughly cleaning the under surface of the push plate or bottom member of the mold box and removing any portion of the charge which may adhere thereto. The brush carriage now retires and the mold box is ready for return to the anvil for a new charge. During the swinging of the loaded mold box as just described the other mold box carried by the arms 79, and which has previously been unloaded at the left-hand unloading table, if swung in a clockwise direction and deposited upon the anvil. As soon as the empty mold box is brought to rest on the anvil the valve controlled by the arm 109 is manipulated to cause a puff of air to blow from the nozzle 106 through the delivery spouts 105. A cloud of fine dry sand is thus blown out of the spouts 105 against the deflector plate 107 and coats the interior surface of the mold whereupon the hopper is again opened and this mold box is filled in the manner above described. The slicker carriage is moved across this newly provided mold box at the same time that the brush carriage as above described is moved over the right-hand unloading table. At the same time, the brush associated with the left-hand table moves forwardly over the latter but this is an idle motion of the brush as the mold box is at this time resting upon the anvil. The operation is thus continued, one box being filled while the other is being emptied, and the shapes after ejection from the respective boxes are conveyed away in opposite directions from the ends of the machine.

*Modifications.*

In Fig. 17 a modified form mold box is illustrated, and in this figure the mold box proper is indicated at 150. The bottom member or push plate 151 is provided with the web or brace 152 having a pair of transverse bars 153 secured thereto. These bars terminate in sleeve members 154, 155 in which rods 160, 161 slide freely. These rods are secured to the outer sides of the mold box proper and are screw threaded at 162, 163 for the reception of stop nuts 164, 165. When the mold is in filling position the lower ends of the rods 160, 161 rest upon the upper surface 166 of the anvil and serve to determine the position of the mold box proper. The operative depth of the mold box in this case is determined by the position of the stop nuts 165 upon which the lower ends of the sleeves 154, 155, rest, thus determining the position of the bottom member or push plate 151 relatively to the box proper. The stop nuts 164 serve to determine the amount of movement of the bottom member 151 with respect to the mold box when the latter is inverted for ejection of the charge. By adjusting the nuts 164 and 165 the parts of the box may be set to compensate for wear occasioned by the movement of the slicker over the top of the box.

In Figs. 15 and 16 a modified form of unloading table is disclosed. In this arrangement the table comprises a plate 167 of a length substantially equal to the length of the pallet and provided at its opposite ends with depending flanges to which the upper ends of pairs of links such as 168 are secured. The lower ends of these links are pivotally mounted upon fixed supporting members 169 carried by the frame of the machine. Springs 170 are provided for normally holding the table in the position shown in Fig. 3, this being the position in which the loaded mold box is placed thereon. With this form of table no conveyor belt is employed. For moving the table, a rotary crank disk 171 is provided, such disk being connected to one of the links 168 by a connecting rod 172. The crank disk may be rotated by hand or mechanical means as desired. The mold box is lowered onto the table and after release of the pallet, is lifted, by the reverse oscillation of the shaft 73 and arm 80, thus leaving the loaded pallet on the table. The table is now moved downwardly by actuation of the crank disk and carries the molded shape laterally and to a position such that the workman has ready access thereto for removing it to the drying oven. In the form of device shown in Fig. 15, the mold box is shown as provided with a modified type of pallet retaining latch. In this figure the mold box is indicated at 173 and the pallet at 174. The mold box proper is provided with outstanding brackets 175 at its opposite sides to which latch members 176 are pivotally secured. Springs 177 normally tend to move the latch members into operative position for clamping the pallet plate to the mold box. These latches are provided with pallet retaining shoulders 177ª and with cam surfaces 178. The end flanges of the unloading table are furnished with upstanding lugs 179 which contact with the cam surfaces 178 of the latch members as the mold box is deposited upon the table, thus swinging the latch members outwardly and freeing the pallet from the mold box.

In Fig. 18 a somewhat modified form of machine is disclosed comprising the vertical supports 1ª upon which the unloading hopper 180 is mounted. This hopper may be of a construction generally similar to that previously described consisting of two like parts and spring means 181 which normally tends to swing such parts away from each other to release the charge. In this instance one side of the hopper is controlled by a cam 182 in the same manner as previously described while the other side is connected by a link 183 to a piston rod 184 having a piston working in a pneumatic cylinder 185 to which air may be supplied at the proper time by means of any suitable form of valve controlled from some of the moving parts of the machine. In this machine the anvil is indicated generally at 186 and the unloading tables at 187, 188 respectively, such unloading tables being of the same general type as those hereinbefore described and having the conveyor belts 189, 190 for conveying away the molded shape after ejection from the mold box. In this instance the mold boxes 191, 192 are mounted upon a horizontally reciprocating carriage 193, having suitable supporting and guiding means (not shown), the mold boxes being mounted to turn upon suitable axles 194, 195 journaled in the carriage. Segmental gears 196, 197 are secured to the axles of the respective mold boxes and the toothed portions of these gears mesh with fixed rack members 198, 199 respectively mounted upon the frame of the machine. Intermediate the toothed portions of the rack members 198, 199 a substantially smooth guiding surface 200 is provided which at times engages the untoothed portion of one or the other of the segmental gears 196, 197. Associated with this smooth guide member 200 is a pair of spaced guide rails 201 with which the lower edges of the mold boxes engage as they move toward filling position and which constitute the operative element of the anvil. The carriage 193 is connected to any suitable mechanism for reciprocating it, such for example as a piston rod 202 having a piston working in a pneumatic cylinder 203 which is supplied with air from any suitable source under control of proper valve mechanism. As indicated in Fig. 18 the mold box 191 is inverted over the unloading table 188 and in position for the ejection of the charge, while the mold box 192 rests upon the rails 201 and is shown as having been filled and as having a pallet plate resting thereon. The carriage 193 is now ready to move to the right, the mold box 192 sliding on the rails 201 while the smooth portion of the gear 197 slides along the member 200. During this movement, the gear 196, which meshes with the rack 198, turns, thereby inverting the mold box 191. The carriage continues to move in this direction until the mold box 192 runs off of the rails 201 at which time the gear 197 meshes with the rack 199 and inverts the box 192. At the same time that the box 192 runs off the rails 201 the box 191 is brought into engagement with such rails. The box 191 which has been emptied at the table 188 is now carried beneath the hopper 180 and is supplied with a charge of material from the latter. At the same time the box 192 which rests over the table 187 discharges its molded shape and is ready to be returned to filling position. The mold boxes are thus alternately filled and emptied in much the same manner as previously described in respect to the mechanism shown in Fig. 1.

While as herein shown the mechanism is designed primarily for actuation by pneumatic means it is evident that any suitable mechanical connections might be employed if desired for transmitting movement in proper timed relation to the several parts. It is also contemplated that various substitutions and rearrangements in the parts, as well as in the details in the construction thereof may be made without departing from the spirit of the invention.

I claim:

1. In a machine of the class described, an anvil, a plurality of unloading tables, a plurality of mold boxes, movable means for supporting said mold boxes, and means for so actuating said movable supporting means that when one of the mold boxes rests upon one of the unloading tables another mold box rests upon the anvil.

2. A machine of the class described comprising a fixed support, charge delivering means above the support, a lever arm pivoted to turn about a horizontal axis above the plane of said support, a mold box carried by the free extremity of said arm and arranged to rest upon the support for receiving a charge from the charge delivering means, an unloading table arranged in a plane above that of the axis of said arm, and means for swinging the arm to carry the mold box from the support to the unloading table.

3. A machine of the class described comprising a fixed anvil having charge delivering means above the same, horizontal shafts disposed at opposite sides of the anvil, a lever arm pivoted upon each shaft, a mold box secured to the free extremity of each arm, unloading tables disposed at opposite sides of the anvil, and means for swinging said lever arms whereby alternately to place the respective mold boxes upon the anvil and upon one of said unloading tables.

4. A machine of the class described comprising an anvil, charge delivering means above the anvil, a pair of lever arms pivoted to turn respectively about horizontal axes arranged at opposite sides of the anvil and above the plane of the latter, a pair of unloading tables disposed in a plane above that of said axes and upon opposite sides of the latter, a mold box carried by the free extremity of each of said lever arms, and means for simultaneously swinging said lever arms in the same direction whereby simultaneously to move one of said mold boxes from its corresponding unloading table to the anvil and to move the other box from the anvil to its respective unloading table.

5. In a machine of the class described, a pair of unloading tables arranged in spaced relation and in substantially the same horizontal plane, a fixed anvil substantially midway between said supporting tables and in a plane below the latter, a horizontal shaft arranged between the anvil and each unloading table, a lever pivoted upon each shaft, a mold box carried by each lever, the parts being so constructed and arranged that when one mold box rests upon one of the unloading tables the other rests upon the anvil, and means for simultaneously swinging said levers in the same direction.

6. In a machine of the class described, a mold box, a rotary shaft, a lever arm secured to the shaft and having the mold box secured to its free extremity, a gear fixed to the shaft, and a reciprocating rack member meshing with the gear for turning the shaft alternately in opposite directions.

7. In a machine of the class described, a rotary shaft, a lever arm secured thereto, a mold box mounted on the lever arm, a crank arm secured to the shaft, a spring secured at one end to said crank arm and at its opposite end to a fixed element of the machine, and means for turning the shaft alternately in opposite directions.

8. In a machine of the class described, a rotary shaft, an arm secured thereto, a mold box carried by the arm, a crank arm secured to the shaft, a tension spring connected to the crank arm and normally tending to turn the latter, a gear fixed to the shaft, and means meshing with the gear for turning the shaft alternately in opposite directions, the parts being so constructed and arranged that the spring serves to counterbalance the weight of the mold box during turning of the shaft.

9. In a machine of the class described, a pair of parallel rotary shafts, arms projecting from said shafts, a mold box secured to the free extremity of each arm, a gear fixed to each of the shafts, and a reciprocating rack bar meshing with said gears and serving simultaneously to turn the shafts in the same direction.

10. In a machine of the class described, in combination, a mold box having a telescopic bottom member, means for filling the box, means for slicking off surplus material from the top of the box, means for inverting the box, means for imparting relative movement to the box and its bottom for ejecting the molded shape from the box, and pneumatic means for actuating the several elements of the mechanism in timed relation.

11. A machine of the class described comprising a mold box provided with a relatively movable push plate, means providing an axis lying in a plane different from that of the bottom of the box about which the box may turn, means for turning the box about such axis to invert it, and means for producing relative movement of the box and its push plate while the box is substantially stationary as respects said axis for discharging a molded shape from the box.

12. A machine of the class described comprising a mold box having a movable bottom, a fixed element for supporting said box below a charge delivery device, means for swinging the box about an axis disposed above and to one side thereof, whereby simultaneously to invert the box and to move it from below the charge delivery device, means for preventing dumping of the charge during inversion of the mold box, and means for discharging the molded shape from the box after inversion of the latter.

13. In a machine of the class described, a mold box, a pivoted lever arm having the mold box secured to its free extremity, means for swinging said lever arm for moving the mold box from filling position to discharging position and for inverting the box during its movement, and means for counterbalancing the weight of the mold box.

14. In a machine of the class described, a mold box, a lever arm for supporting the mold box, means for swinging the lever arm to carry the mold box from filling to discharging position while concomitantly inverting the mold box, and adjustable means for counterbalancing the weight of the mold box.

15. In a machine of the class described, a mold box, a lever arm for supporting said mold box, means for swinging said lever arm, and spring means reacting upon said arm for counterbalancing the weight of the mold box.

16. In combination in a machine of the class described a mold box having a telescopic bottom member, means supporting said box to turn about a fixed axis, and means for turning said box alternately in opposite directions.

17. In a molding machine in combination, a mold box having a telescopic bottom member, means supporting the box to turn alternately in opposite directions about a fixed axis, means for turning the box to invert it, and means for producing relative movement of the box and its bottom after inversion of the box.

18. A machine of the class described comprising a mold box mounted to turn about a fixed axis, said box being provided with a telescopic bottom member, fixed means for supporting said box in horizontal charge receiving position, means for inverting the box and for producing relative movement of the box and its bottom to discharge a molded shape from the box, and means for restoring the box and its bottom to initial position.

19. A machine of the class described comprising a mold box, charge delivering means, a slicker device, and pneumatic means for actuating said devices in timed relation for producing molded shapes.

20. A machine of the class described, a mold box, a telescopic bottom member therefor and adjustable means for determining the normal position of said bottom with respect to the box.

21. In a machine of the class described, a mold box, a telescopic bottom therefor, and means for adjustably determining the normal position of said bottom with respect to the upper edge of the box during the filling of the latter.

22. In a machine of the class described, a mold box, a telescopic bottom member therefor, guide elements for said bottom member, and means associated with said guide elements for limiting relative movement of the bottom member and the box.

23. In a machine of the class described, a mold box, a telescopic bottom therefor, a pair of sleeves carried by said bottom member and rods secured to the box and sliding within said sleeves for guiding the bottom member in its movements relatively to the box.

24. In a machine of the class described, a mold box, a telescopic bottom member therefor, said bottom member being provided with oppositely disposed sleeve elements, a pair of rods secured to opposite sides of the mold box and slidable within the respective sleeves, and adjustable stops secured respectively to each of said rods above and below the sleeves.

25. In a machine of the class described, a mold box, a movable bottom member therefor, said bottom member being provided with a sleeve element, a rod secured to the mold box and slidable within said sleeve element, and adjustable stops carried by the rod for limiting movement of the bottom member relative to the mold box.

26. In a machine of the class described, in combination, a bodily movable mold box, a pallet clamping latch carried thereby, and means cooperable with said latch in one position of the box for rendering said latch inoperative.

27. In a machine of the class described, a mold box, pallet clamping means carried thereby, means for inverting and imparting bodily movement to the mold box, and means operative substantially at the completion of such bodily movement for rendering said clamping means inoperative.

28. In a machine of the class described, a mold box, means carried thereby for clamping a pallet plate thereto, means for inverting the mold box, and automatic means for rendering said clamping means inoperative after inversion of the box.

29. In a machine of the class described, a vertically movable mold box, a pallet clamping latch carried thereby, said latch being provided with an actuating lug, and a fixed element engageable by said lug for rendering said latch inoperative.

30. In a machine of the class described, in combination, a mold box, means permitting inversion of the mold box, a pallet clamping latch carried by the mold box, and means cooperable with said latch for rendering the latter inoperative in either upright or inverted position of the box.

31. In a machine of the class described, a mold box, means carried thereby for clamping a pallet plate thereto, means for transferring the mold box from charge receiving to charge delivering position, and means for rendering said clamping means inoperative as the mold box reaches delivering position.

32. In a machine of the class described, a fixed support, means for depositing a mold box upon said support, means for clamping a pallet plate to the mold box, and means operative as the mold box approaches said support for rendering said means inoperative.

33. In a machine of the class described, a fixed anvil, charge delivering means above the anvil, a movable mold box, a latch device for securing a pallet plate to the mold box, means for positioning the mold box upon the anvil, and means for rendering said latch inoperative as the mold box approaches the anvil.

34. A molding machine comprising a fixed support, a mold box open at top and bottom normally resting upon said support, means for filling the mold box while so positioned, means for retaining a cover member upon the box permitting the inversion of the box, and means for freeing the cover member from its holding means.

35. In a machine of the class described, a mold box, a latch member pivotally mounted thereon and having a shoulder normally overhanging the upper edge of the box for engaging a pallet plate for clamping the latter to the box, spring means normally operative for holding the latch in clamping position, and means for retracting the latch for permitting application and disengagement of the pallet plate.

36. A machine of the class described comprising a fixed support, charge delivering means above the support, a mold box, means for securing a pallet plate to the top of the mold box, means for imparting vertical movement to the mold box to deposit it upon the fixed support, and means operative during the latter part of such movement of the box for rendering the pallet retaining means inoperative.

37. In a machine of the class described, an anvil, a mold box, a shaft journaled at either side of the mold box, latch members mounted upon the shaft for engagement with a pallet plate for clamping the latter to the mold box, spring means normally tending to turn said shafts to hold the latches in operative position, lugs projecting from the respective shafts, means for imparting bodily movement to the mold box to deposit it upon the anvil, and a pair of fixed posts engageable with respective lugs during the latter part of such movement for swinging the latch members out of operative position.

38. In a machine of the class described, a mold box, a pallet clamping latch pivotally mounted thereon, spring means normally tending to hold said latch in operative position, and a pair of ears secured to said latch and constituting means for moving the latch to inoperative position.

39. A machine of the class described comprising a mold box having spring actuated latches mounted at opposite sides thereof, said latches having shoulders for engagement with a pallet plate to clamp the latter to the mold box, and outstanding ears connected with the respective latches and serving as means for swinging the latches to inoperative position.

40. A machine of the class described comprising a mold box, lugs projecting from the side of the box, a shaft journaled in said lugs, latch members fixed to the shaft and having elements for engagement with a pallet plate for clamping the latter to the box, spring means coacting with said shaft and normally operative to hold the latch members in clamping position, and means whereby the shaft may be turned in opposition to said spring means.

41. In a machine of the class described, an invertible mold box, a pivoted latch carried thereby, said latch having a shoulder for engagement with a pallet plate for clamping the latter to the mold box, a pair of oppositely directed lugs secured to said latch, and means engageable with the respective lugs when the mold box is in upright or inverted position respectively for swinging the latch to inoperative position.

42. In a machine of the class described, a mold box, means for supporting the mold box for receiving a charge, an unloading table, means for moving the mold box from said support to the unloading table, means carried by the mold box for clamping a pallet plate thereto during such movement, and means associated with the unloading table for releasing said clamping means when the mold box is deposited upon the unloading table.

43. In a machine of the class described, a mold box, latch means for securing a pallet thereto, a fixed support, an unloading table, means for transferring the mold box from the fixed support to the unloading table, means associated with the fixed support for rendering the clamping means inoperative while the mold box rests upon the support, and means associated with the unloading table for rendering said latch means inoperative when the mold box is deposited upon said table.

44. In a machine of the class described, an unloading table, a mold box, means for supporting the mold box in position to receive a charge, a latch for securing a pallet plate to the top of the mold box, means for inverting the mold box upon the unloading table, a lug connected with the latch, and a vertically movable member associated with the table and engageable with said lug for moving the latch out of operative position.

45. In a machine of the class described, a mold box, and unloading table, means for clamping a pallet plate to the top of the mold box and for inverting the box and depositing it upon the table, and a cam actuated element for rendering said clamping means inoperative while the box rests upon said table.

46. A machine of the class described comprising a fixed support, charge delivering means associated therewith, an unloading table, a mold box, means for depositing the mold box upon the support for receiving a charge and for moving the filled box to the unloading table, a pivoted latch carried by the mold box for securing a pallet plate thereto during movement of the mold box from the support to the unloading table, a pair of lugs associated with said latch, means carried by the support and engageable with one of said lugs for swinging the latch to inoperative position when the mold box rests upon the support, and means associated with the unloading table and engageable with the other of said lugs for rendering the latch inoperative when the mold box rests upon the unloading table.

47. In a machine of the class described, in combination, an unloading table, means for supporting a mold box in load-receiving position, said mold box having a telescopic bottom, means for clamping a pallet plate to the mold box, means for inverting the mold box and depositing it in inverted position upon the unloading table, and a vertically movable cam actuated element operative successively to render said clamping means inoperative and to impart relative movement to the mold box and its bottom for ejecting the charge from the box.

48. In a machine of the class described, in combination, an unloading table, a mold box having a movable bottom member, means for supporting the box in loading position, clamping means for securing a plate to the top of the box, means for transferring the mold box from loading position to the unloading table and for inverting the box thereon, and common means for rendering said clamping means inoperative and for imparting relative movement to the box and its bottom for ejecting the charge.

49. In a machine of the class described, an unloading table, means for supporting a mold box for receiving a charge, pivoted latch means carried by the mold box for securing a pallet plate thereto, means for inverting the mold box and depositing it upon the unloading table, and a vertically movable member engageable with an element of the latch for rendering the latter inoperative and for thereafter raising the mold box relatively to the table.

50. In a machine of the class described, a mold box, a pallet clamping latch pivotally mounted thereon, spring means normally tending to move the latch into clamping position, means for limiting the movement of the latch in the opposite direction, and means engageable with an element of the latch for first swinging the latch out of operative position, and for thereafter imparting bodily movement to the box.

51. In a machine of the class described, a mold box, a pallet-retaining latch member pivotally mounted thereon, a pair of oppositely directed lugs movable with said latch member, a stop element projecting from the box and engageable with one of said lugs to limit movement thereof, and means engageable with the other of said lugs for swinging said latch out of operative position and for bodily lifting the mold box after the first of said lugs is brought into engagement with said stop element.

52. In a machine of the class described, a vertically movable unloading table, a fixed support, charge delivering means arranged above said support, a mold box having a telescopic bottom member, means for depositing the mold box upon the support for receiving a charge of material, a pivoted latch carried by the mold box for clamping a pallet plate thereto, said latch having an outstanding lug, means for inverting the mold box with the pallet plate clamped thereto and for depositing the box upon the unloading table, and common means operative successively to engage said lug and render the latch inoperative, for imparting relative movement to the mold box and bottom member to eject the charge, and for moving the table downwardly with the loaded pallet plate thereon.

53. A machine of the class described comprising a fixed anvil, a mold box provided with a push plate, means for moving the mold box with its push plate toward and from the anvil, means for filling the mold box while resting upon the anvil, means for removing the box from the anvil, means for producing relative movement of the box and push plate for discharging the molded shape from the box, and means for receiving and for conveying away the shape discharged from the box.

54. A machine of the class described comprising a fixed anvil, a pair of mold boxes, means for moving said mold boxes in alternation onto and away from said anvil, means for filling a box while resting upon the anvil, means for discharging the molded shape from the box while removed from the anvil, and means for conveying such shape away from the point of discharge.

55. In a machine of the class described, charge delivering means, a plurality of molds, a plurality of unloading tables, means for moving the several molds from charge receiving position to one of the unloading tables, and conveyor means leading from each unloading table for carrying molded shapes therefrom.

56. In a machine of the class described, an anvil, charge delivering means above the anvil, an unloading table disposed at either side of the anvil, a pair of molds, means for moving the respective molds in alternation from the anvil to one of the unloading tables, and an endless conveyor leading from each of said unloaded tables for carrying the molded shapes away therefrom.

57. In a machine of the class described, a mold box, means for delivering a charge of material into the mold box, means for supporting a molded shape, and a guard screen interposed between said latter means and the mold to prevent spattering surplus material upon a molded shape resting upon said supporting means.

58. In a machine of the class described, a mold, means for moving the mold from filling to discharging position, and means for preventing spattering material during the filling of the mold upon previously discharged shapes at the discharge position.

59. In a machine of the class described, charge delivering means, means for positioning a mold box for receiving a charge of material and for subsequently moving the mold box to unloading position, and a screen interposed between the filling and unloading positions of the box for preventing spattering the material upon a mold charge at the unloading position.

60. In a machine of the class described comprising an anvil, an unloading table, means for moving a mold from the anvil to the unloading table, means for forcibly projecting a charge of material into the mold while resting on the anvil, and a screen interposed between the anvil and the unloading table.

61. In a machine of the class described, a fixed support, an unloading table, means for moving a mold from said fixed support to the unloading table, and means for filling the mold while resting upon said support, the support and the unloading table being so positioned as to prevent spattering the surplus material upon the unloading table during the filling of the mold.

62. In a machine of the class described, a bodily movable unloading table, means for depositing a filled mold box thereon, and common means for causing ejection of the mold shape onto the table, and for imparting bodily movement to the table.

63. In a machine of the class described, an unloading table, means for depositing a filled mold upon the table, and common means for causing the ejection of the mold shape from the mold onto the table and for moving the table to a position to permit removal of the mold shape therefrom.

64. In a machine of the class described, an unloading table, a substantially horizontal endless conveyor arranged in a plane below the normal plane of the table, means for depositing a mold box upon the table, and common means for ejecting the charge from the mold box onto the table and for lowering the table to deposit such charge upon the conveyor.

65. In a machine of the class described, a vertically movable unloading table, a mold box, means for depositing the mold box upon the table, a vertically movable rod engageable with an element carried by the mold box for lifting the latter, and means carried by the rod for moving the table downwardly.

66. In a machine of the class described, a vertically movable unloading table, an endless conveyor having one run thereof disposed in a plane below the normal plane of the table, means for depositing a filled mold upon the table, and common means for causing ejection of the mold shape from the mold box onto the table and for causing the table to descend whereby to deposit the mold shape upon said run of the conveyor.

67. In a machine of the class described, a mold box having a push plate associated therewith, means carried by the box for clamping a pallet plate to the top thereof, a movable unloading table, means for transferring the mold box with the push plate and pallet from loading position to the table and for depositing the mold box in inverted position upon the table, and means operative successively to release the pallet clamping means, to impart relative movement to push the plate and box for ejecting the mold shape, and for imparting bodily movement to the table with the loaded pallet resting thereon.

68. In a machine of the class described, an unloading table, means for guiding said table for vertical movement, springs normally tending to retain said table in elevated position, and means for depressing said table.

69. In a machine of the class described, a vertically movable unloading table, means for guiding the table in its movements, means normally tending to hold said table in predetermined position, and power actuated means for moving said table downwardly at intervals.

70. In a machine of the class described, a vertically movable unloading table, spring means normally tending to hold said table at a predetermined elevation, and cam means for moving the table downwardly in opposition to said spring means.

71. In a machine of the class described, a vertically movable unloading table, means normally tending to hold said table at a predetermined elevation, a link secured to said table, said link being also secured to one end of a lever, and means engageable with the opposite end of the lever for swinging the latter whereby to pull the table downwardly.

72. In a machine of the class described, a vertically movable unloading table, a normally horizontal lever, means connecting one end of the lever with the table, a vertically movable crosshead, cam means for raising said crosshead, and an adjustable contact element movable with said crosshead and engageable with the other arm of the lever for moving the table downwardly.

73. In a machine of the class described, an unloading table, spring means normally tending to raise said table, means for limiting movement of the table under action of the spring means, a vertically movable crosshead, a vertically disposed rod secured to said crosshead, a stop member carried by the rod, means engageable by said stop member during the vertical movement of the rod for moving the table downwardly, and cam means for raising the crosshead.

74. In a machine of the class described, a vertically movable unloading table, means for depositing a mold box having pallet clamping means upon said table, a vertically movable crosshead, a pair of rods carried by said crosshead, said rods being provided with elements engageable with the pallet retaining means for rendering the latter inoperative, and means carried by one of said rods for causing the table to move downwardly subsequently to the release of said pallet retaining means.

75. A machine of the class described comprising a pair of mold boxes, means for moving said boxes alternately into filling and discharging position, means for concomitantly filling one box while ejecting the charge from the other, a reciprocating carriage, means mounted upon said carriage for slicking off surplus material from the newly filled box, and means moving in time with said carriage for cleaning an element of the emptied box.

76. In a machine of the class described, means for supporting a mold box for filling, means for supporting a mold box for ejection of its charge, a slicker associated with said first means, a mold cleaning brush associated with the second-named means, and pneumatic devices for simultaneously actuating said slicker and cleaning means.

77. In a machine of the class described, an anvil for supporting a mold box during filling, an unloading table disposed at either side of said anvil, a slicker device movable across the anvil for removing surplus material from a filled mold resting thereon, a brush movable across each of said unloading tables for cleaning elements of an emptied mold box resting thereon, pneumatic cylinders for actuating the slicker and said brushes, respectively, and common means for supplying actuating fluid to said cylinders.

78. In a machine of the class described, an unloading table, means for depositing a mold box thereon for ejection of its charge, a reciprocating brush carriage associated with said unloading table, and a motor driven brush mounted upon said carriage for cleaning elements of the mold box after ejection of the charge.

79. In a machine of the class described, a hopper having a movable door, spring means normally tending to close said door, and a fluid operated piston for closing said door.

Signed by me at Boston, Massachusetts, this seventh day of December, 1922.

CHARLES LADD NORTON.

---

Certificate of Correction.

It is hereby certified that in Letters Patent No. 1,524,877, granted February 3, 1925, upon the application of Charles Ladd Norton, of Boston, Massachusetts, for an improvement in "Molding Machines," errors appear in the printed specification requiring correction as follows: Page 12, line 19, claim 45, for the word "and" read an; page 13, line 27, claim 56, for the word "unloaded" read *unloading*, and line 28, strike out the article "the"; same page, lines 73, 78, 81, 105, 107, and 120, claims 62, 63, 66, and 67, for the word "mold" read *molded*; same page, line 119, claim 67, before the word "push" insert the article *the*, and line 120, strike out the article "the", first occurrence; and that the said Letters Patent should be read with these corrections therein that the same may conform to the record of the case in the Patent Office.

Signed and sealed this 3d day of March, A. D. 1925.

[SEAL.]

KARL FENNING,
*Acting Commissioner of Patents.*